(12) United States Patent
Alsobrook et al.

(10) Patent No.: US 7,048,957 B2
(45) Date of Patent: May 23, 2006

(54) METHOD AND APPARATUS FOR PROCESSING VEGETABLES

(75) Inventors: J. Kevin Alsobrook, Yuma, AZ (US); Antonio Cicchino, Yuma, AZ (US); Jose Bojorquez, Yuma, AZ (US)

(73) Assignee: Fresh Innovations, LLC, Yuma, AZ (US)

( * ) Notice: Subject to any disclaimer, the term of this patent is extended or adjusted under 35 U.S.C. 154(b) by 47 days.

(21) Appl. No.: 10/859,864

(22) Filed: Jun. 2, 2004

(65) Prior Publication Data

US 2005/0175752 A1    Aug. 11, 2005

Related U.S. Application Data

(63) Continuation-in-part of application No. 10/777,667, filed on Feb. 10, 2004.

(51) Int. Cl.
*A23N 15/04* (2006.01)

(52) U.S. Cl. .................. 426/481; 426/482; 426/395; 426/106; 426/518; 426/618; 99/540; 99/570; 99/584

(58) Field of Classification Search ............... 426/481, 426/482, 395, 106, 518, 615; 99/540, 570, 99/584

See application file for complete search history.

(56) References Cited

U.S. PATENT DOCUMENTS

| | | | |
|---|---|---|---|
| 858,094 A * | 6/1907 | Monte | 99/470 |
| 3,602,279 A * | 8/1971 | Van Raaij | 99/584 |
| 3,621,900 A | 11/1971 | Rood | |
| 3,636,999 A * | 1/1972 | Cordes | 99/636 |
| 3,646,978 A | 3/1972 | Tait | |
| 3,678,976 A | 7/1972 | Orlowski | |
| 3,734,004 A * | 5/1973 | Losito | 99/637 |
| 3,754,461 A | 8/1973 | Lazzarini | |
| 3,989,110 A | 11/1976 | Medlock et al. | |
| 4,068,011 A | 1/1978 | Green et al. | |
| 4,141,201 A | 2/1979 | Christensen | |
| 4,202,261 A | 5/1980 | Lawson | |
| 4,236,581 A | 12/1980 | Beckett | |
| 4,244,252 A | 1/1981 | Pellaton | |
| 4,258,618 A | 3/1981 | Lawson | |
| 4,361,084 A | 11/1982 | Raatz | |
| 4,430,933 A | 2/1984 | Boots | |
| 4,450,762 A | 5/1984 | Lustig | |

(Continued)

FOREIGN PATENT DOCUMENTS

DE    4218210 A1 * 12/1993

(Continued)

OTHER PUBLICATIONS

Canadian Food Information Council, entitled "Food Safety in Canada: Pre-Packaged Vegetables" http://www.cfic.ca/viewarticle.asp?id=2&article=14&lang=english.

*Primary Examiner*—Milton I. Cano
*Assistant Examiner*—Sarah L. Kuhns
(74) *Attorney, Agent, or Firm*—Duckor Spradling Metzger & Wynne; Bernard J. Kleinke (57) ABSTRACT

According to certain embodiments of the invention, there is provided a method and an apparatus relating to an infeed for positioning the green onions in a generally horizontal position on a conveyor and a transition conveyor for transporting the horizontally disposed green onions and transporting them to a substantially vertical disposition to present them to a peeler for removing the outer skins of the onion and a de-rooter for shortening or removing the roots from the onions.

10 Claims, 6 Drawing Sheets

U.S. PATENT DOCUMENTS

| | | |
|---|---|---|
| 4,457,224 A | 7/1984 | Kino |
| 4,481,875 A | 11/1984 | Toyosato |
| 4,524,681 A | 6/1985 | Harris et al. |
| 4,585,073 A | 4/1986 | Mayeda et al. |
| 4,602,559 A | 7/1986 | Suzuki et al. |
| 4,629,005 A | 12/1986 | Hood, Jr. et al. |
| 4,658,713 A | 4/1987 | Nagaoka |
| 4,660,653 A | 4/1987 | Mayeda et al. |
| 4,718,334 A | 1/1988 | Nagaoka |
| 4,753,296 A | 6/1988 | Kruithoff |
| 4,792,455 A | 12/1988 | Tallafus |
| 5,000,087 A | 3/1991 | Nagaoka |
| 5,225,233 A | 7/1993 | Komatsu et al. |
| 5,316,778 A | 5/1994 | Hougham |
| 5,437,886 A | 8/1995 | Atkins et al. |
| 5,518,747 A | 5/1996 | Pike, Jr. |
| 5,727,690 A | 3/1998 | Hofmeister |
| 5,750,171 A | 5/1998 | Shuknecht |
| 6,053,098 A | 4/2000 | Yamamoto |
| 6,419,028 B1 | 4/2000 | Provitola |
| 6,308,600 B1 | 10/2001 | Dragt |
| 6,413,566 B1 | 7/2002 | Caridis et al. |
| 6,443,234 B1 | 9/2002 | Raymond |
| 6,484,810 B1 | 11/2002 | Bendix et al. |
| 2001/0026824 A1 | 10/2001 | Caridis et al. |
| 2003/0056627 A1 | 3/2003 | Hubert |

FOREIGN PATENT DOCUMENTS

| | | | |
|---|---|---|---|
| FR | 2747273 A1 | * | 10/1997 |
| JP | 04053477 A | * | 2/1992 |
| JP | 09037626 A | * | 2/1997 |

* cited by examiner

METHOD AND APPARATUS FOR PROCESSING VEGETABLES

RELATED APPLICATIONS

This application is a continuation-in-part patent application of U.S. non-provisional patent application entitled "METHODS AND APPARATUS FOR PROCESSING VEGETABLES," application Ser. No. 10/777,667, filed Feb. 10, 2004, which is incorporated herein by reference as if fully set forth herein.

FIELD OF THE INVENTION

The present invention relates in general to a method and apparatus for processing vegetables. It more particularly relates to a method and apparatus for processing green onions or similar rooted vegetables.

BACKGROUND ART

There is no intention to admit that the background art disclosed in this section legally constitutes prior art.

Currently, vegetables such as green onions are processed manually. The processing includes peeling away the foreskin or outer leaves from the stalk of the onion near its bulb for discarding it. Additionally, the roots of the onion are trimmed by cutting them off with suitable cutting blades.

In order to facilitate the processing of the green onions or other such vegetables, there have been attempts to automate the process. One such attempt utilized soft faced or spongy conveyor belts to move green onions one at a time to pairs of counter-rotating brushes. The onions were supported at one end in a horizontal disposition by the conveyor belts and at the other end by the rotating brushes in an attempt to remove the outer unwanted skins from the onions.

Another such attempt is disclosed in U.S. Pat. No. 3,989,110. This patent discloses conveyor belts for moving the green onions in a vertical disposition and rotating them about their vertical axes as they are being translated into engagement with oppositely rotating rollers or belts on either side of the green onions in an attempt to rip away the outer leaves or skins from the stems of the onions.

BRIEF DESCRIPTION OF THE DRAWINGS

The following is a brief description of the drawings accompanying this application.

DETAILED DESCRIPTION OF CERTAIN EMBODIMENTS OF THE INVENTION

According to certain embodiments of the invention, there is provided a method and an apparatus relating to an infeed for positioning the green onions in a generally horizontal position on a conveyor and a transition conveyor for transporting the horizontally disposed green onions and transporting them to a substantially vertical disposition to present them to a peeler for removing the outer skins of the onion and a de-rooter for shortening or removing the roots from the onions.

Figure 1:
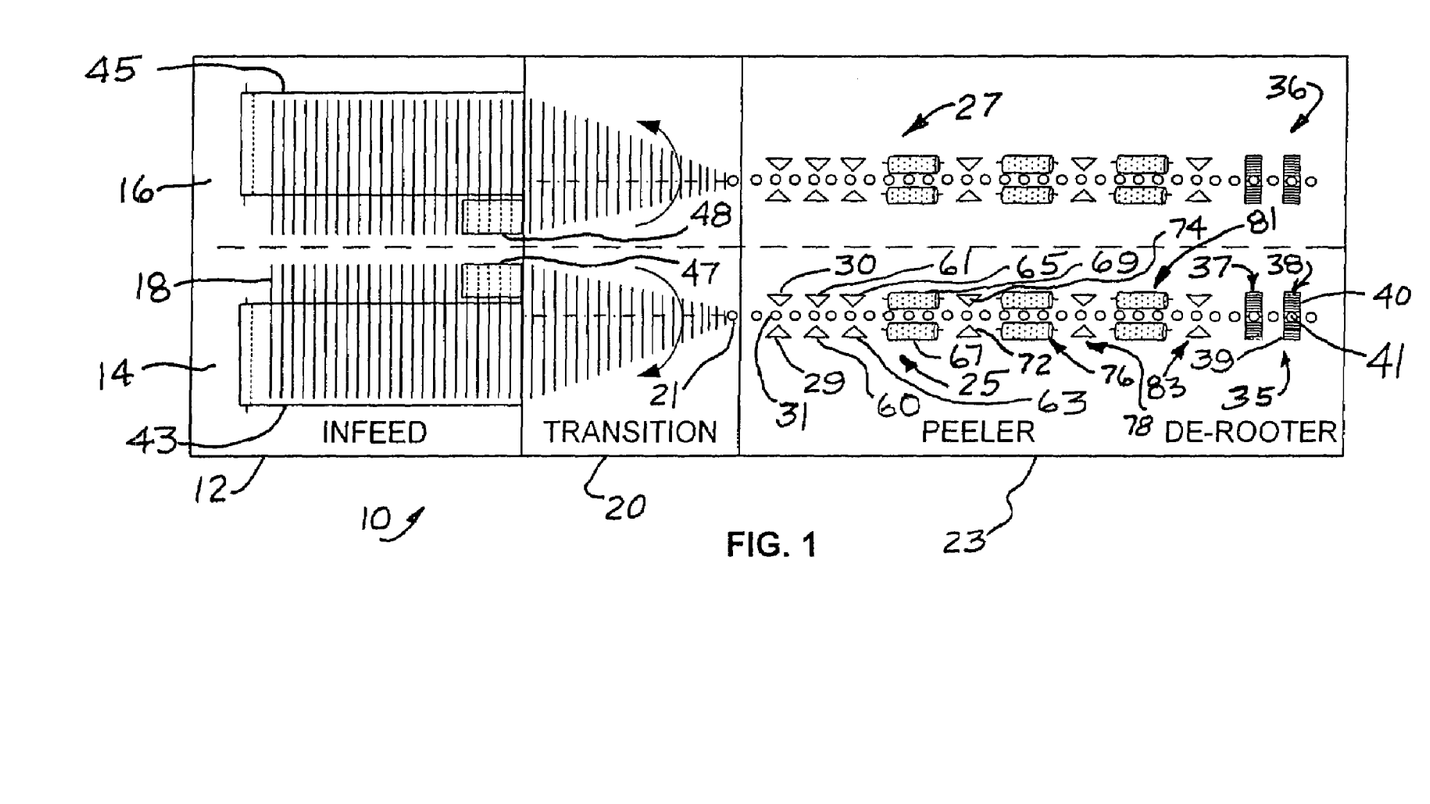
FIG. 1 is a diagrammatic plan view of a vegetable processing system, which is constructed in accordance with an embodiment of the present invention.

According to one of the disclosed embodiments of the invention and referring to FIG. 1, there is shown a vegetable processing system 10, which is constructed in accordance with an embodiment of the present invention. While the disclosed embodiments relate to the processing of green onions, it is to be understood that the methods and apparatus of the present invention contemplate the processing of other vegetables as well.

The system 10 generally comprises an infeed apparatus 12 at the front end of the system 10. Infeed apparatus 12 contains two infeed stations 14 and 16 disposed in a generally parallel side-by-side lanes. The first infeed station 14 is disposed on the left side of the infeed and the second infeed station is disposed on the right side of the infeed. The infeed stations 14 and 16 are similar in structure and function and are designed to facilitate manually receiving green onions, such as onion 18, thereon in a substantially horizontal disposition and transporting the onions to a transition conveyor 20. Each infeed station contains one infeed conveyor. It is contemplated that the onions can be placed and transported through the infeed at a horizontal or about 0 degree disposition, or at a slight angle of about 20 degrees. As such, the infeed station 14 includes an infeed conveyor 43 and the infeed station 16 includes an infeed conveyor 45. In operation, green onions are generally placed on infeed conveyors 43 and 45 by human workers or other mechanical means (not shown) and are arranged generally horizontally spaced apart in a spaced apart generally orderly configuration as best shown in FIG. 1. The transition conveyor 20 is positioned at the exit end of infeed 12 and receives horizontally disposed green onions at its input side, such as onion 18, and rotates the onions to a substantially vertical position. For example, an onion 21 disposed at the exit end of transition conveyor 20 is transitioned from a generally horizontally disposed onion to a generally vertically disposed onion.

Green onions exiting transition conveyor 20 are conveyed to a peeler and de-rooter processor 23. Peeler and de-rooter processor 23 includes a pair of peeler systems 25 and 27 preferably configured in generally parallel side-by-side lanes, where the first peeler system 25 is placed on the left side and the peeler system 27 is placed on the right side of peeler and de-rooter processor 23. Peeler systems 25 and 27 are similar to one another, and only the system 25 will be described. The peeler systems 25 and 27 remove the outer skins or leaves of the green onions. The peeler systems provide a novel method of removing the outer skins reliably, efficiently and with little or no damage to the green onions by using high pressure streams of water, which also help to clean the onions of dirt and debris.

Figure 2:
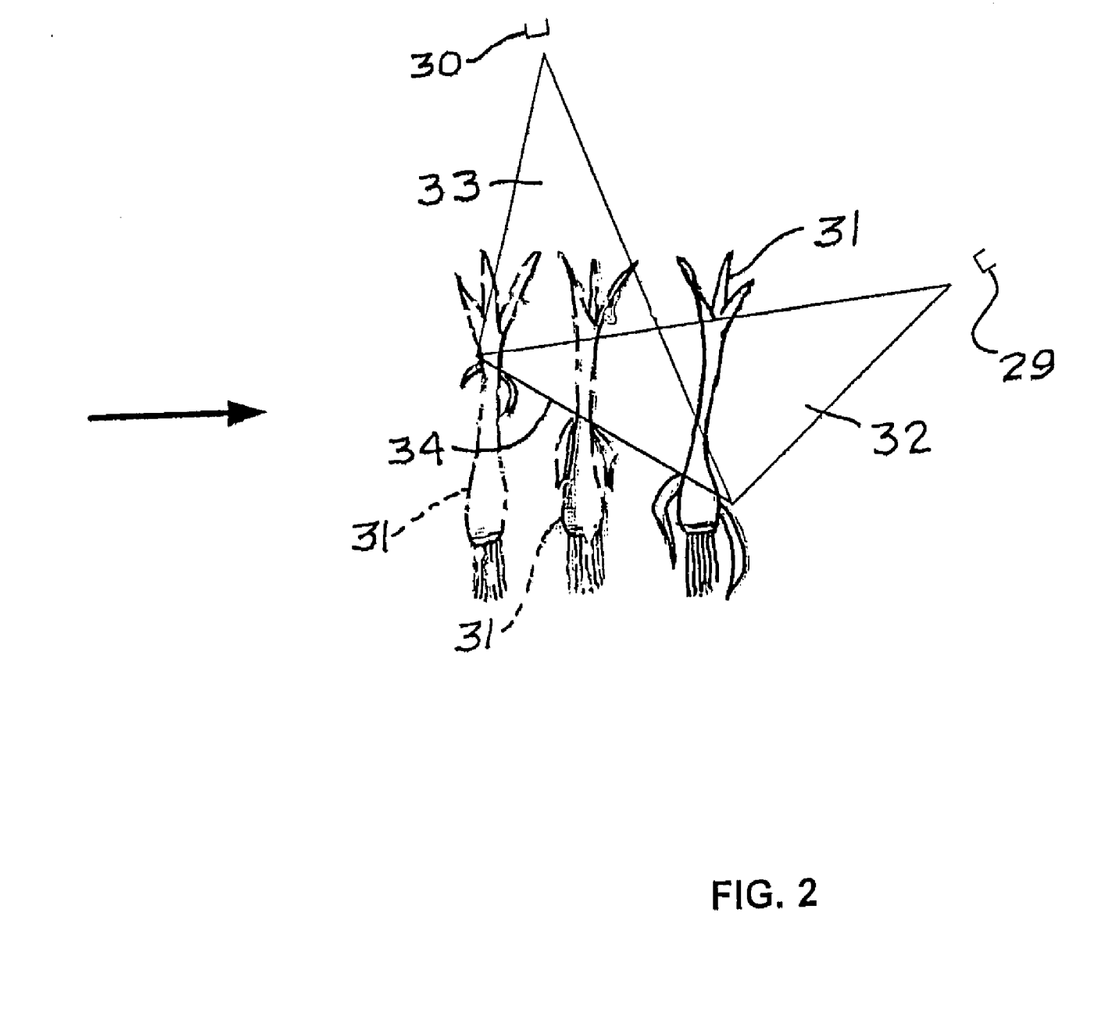
FIG. 2 is an enlarged diagrammatic view of a peeling operation according to an embodiment of the present invention.
Figure 5:
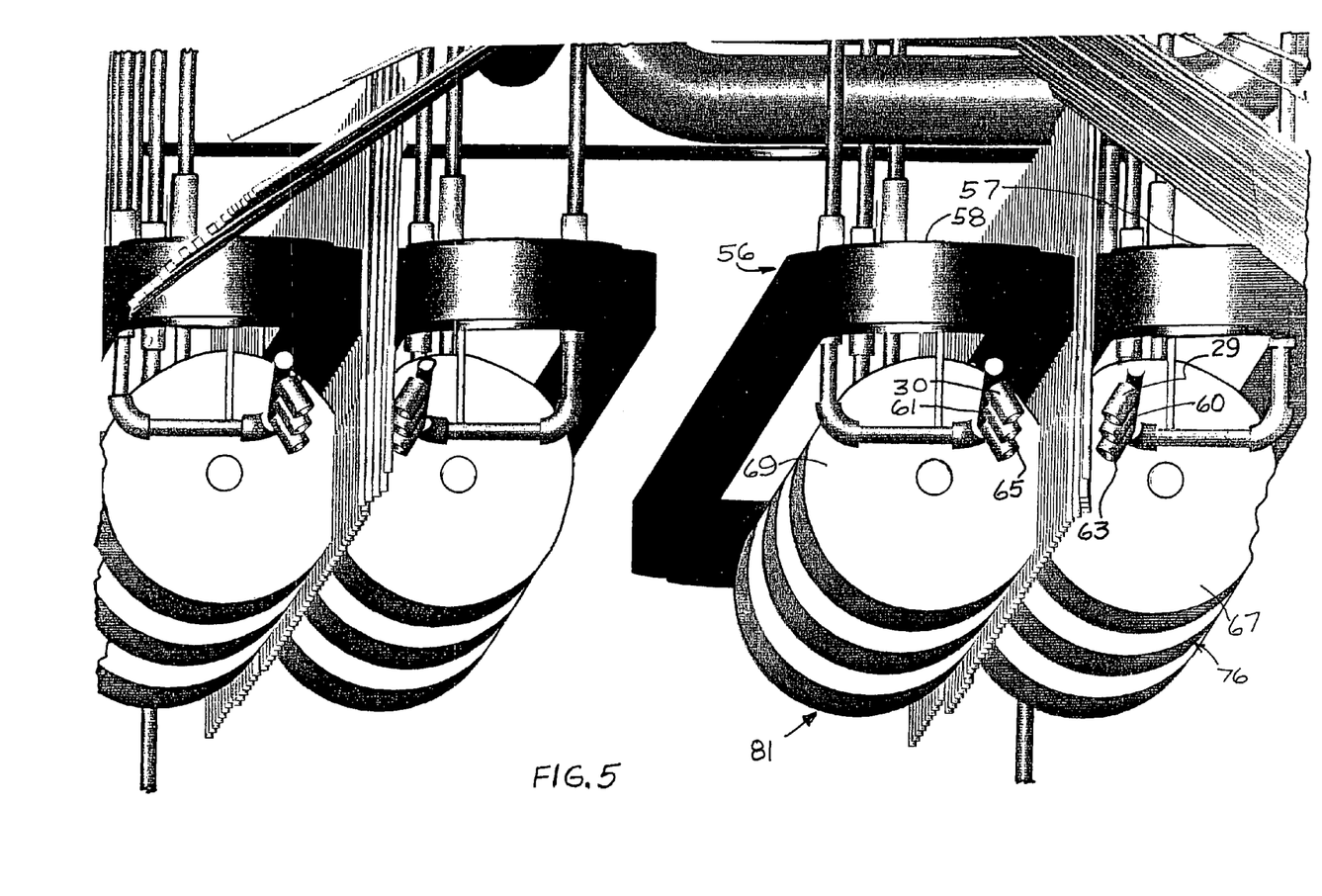
FIG. 5 is an enlarged pictorial diagrammatic view of the peeler portion of the system of FIG. 1.

Considering now the peeler systems, such as peeler system 25, in greater detail and with reference to FIGS. 1, 2 and 5, the peeler system 25 is adapted to receive onions conveyed from the exit end of transition conveyor 20. Green onions, such as onion 31, advance through the peeler and de-rooter processor 23.

Peeler system 25 includes a pair of opposed angularly downwardly inclined opposed water jets 29 and 30 that emit water stream under pressure in a desired spray patterns. As best shown in FIG. 2, water Jet 29 emits a spray pattern 32 and water jet 30 emits spray pattern 33. Spray patterns 32 and 33 may be generally fan shaped, although other patterns may also be used. Each water jet 29 and 30 is directed angularly downwardly to intersect at an angularly inclined line 34. The water jets 29 and 30 are also directed in such a way as to have the intersecting water stream line 34 be inclined toward the line of advancement (shown by the arrow in FIG. 2) of the green onions and at an angle non-parallel to the point of travel of the onions. The angle of the intersecting water stream 34 is inclined downwardly towards the exit end of the peeler and de-rooting processor 23 as best shown in FIG. 2. Intersecting water stream line 34 has the unexpected properties of being capable of peeling the outer skin of a green ohion when gradually moved from near the top of the onion where the outer skin is generally already separated from the bulb and down the bulb toward the root of the onion as it advances through and past the line 34.

As the onion 31 advances past the water jets 29 and 30, the water under pressure first is directed downwardly on an upper portion of the onion 31 to peel downwardly the loose over skins. As the onion continues to advance, the spray patterns intersect at progressively lower portions of the onion 31, as indicated by the two broken line showings of the onion 31, to cause the outer skins to continue to peel downwardly and finally as shown in solid lines, are peeled away from the stalk of the onion 31.

In a portion as best shown in FIG. 2, the top ends of green onions, such as onion 31, enter the intersecting water stream 34. As the onion 31 continues to advance through the intersecting water stream 34, the intersecting water stream 34 continues to downwardly peel the outer skin as the onion's point of contact on the intersecting water stream 34 moves further toward the root of the onion. The point of contact on the onion moves toward the root of the onion 31 because the angle of the intersecting water stream 34 is non-parallel to the advancement direction of the onion 31 and is inclined downwardly towards the back end of the system 10. After the outer skin is removed from the green onion by the peeling system, the green onions, such as onion 31 are advanced to the de-rooter 35.

De-rooter 35 separates the roots, or portions thereof, from the green onions, as hereinafter described in greater detail, and as further described in the foregoing mentioned patent application. It should be understood that the methods and devices disclosed in the foregoing mentioned application may also be employed in the processor 23, as well as other techniques.

By separating the roots or portions thereof at the root crown from the green onions, the remaining portion of the root crown attached to the bottom of the bulb of the green onion, prevents or at least greatly tends to eliminate the unwanted telescoping growth of the green onion after the roots are removed. The method and apparatus for de-rooting as disclosed herein may help to prevent or to inhibit such unwanted growth for some applications, and thus may promote longer shelf life of the green onions.

Figure 3:
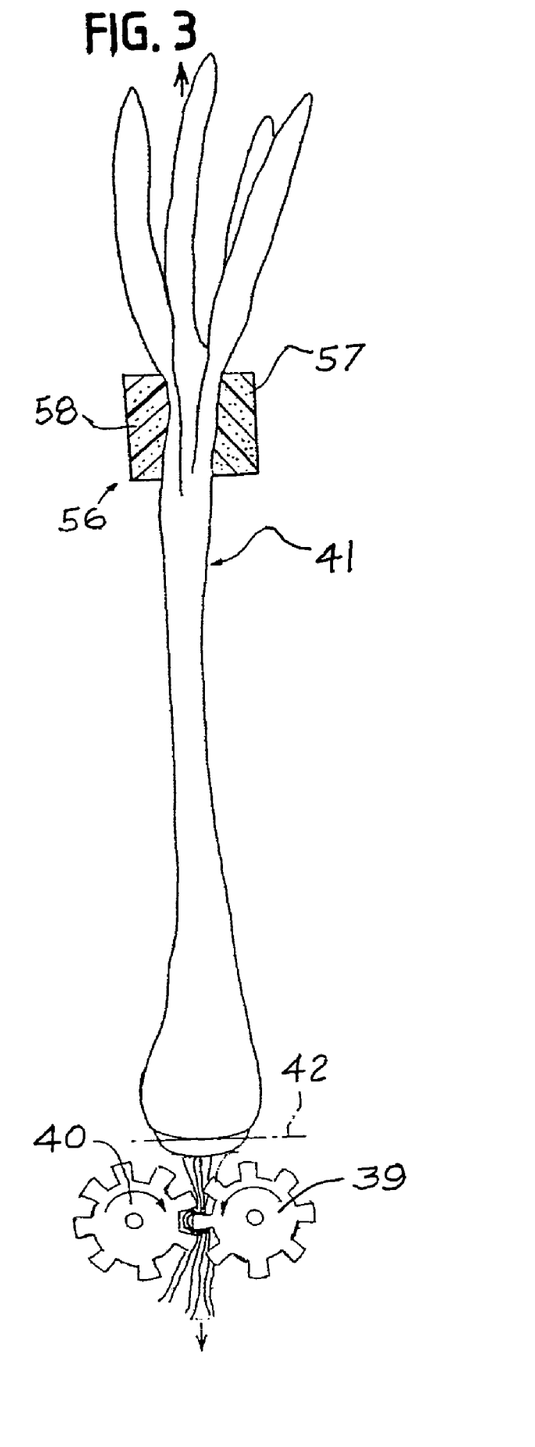
FIG. 3 is an enlarged diagrammatic view of the de-rooter of the system of FIG. 1.
Figure 6:
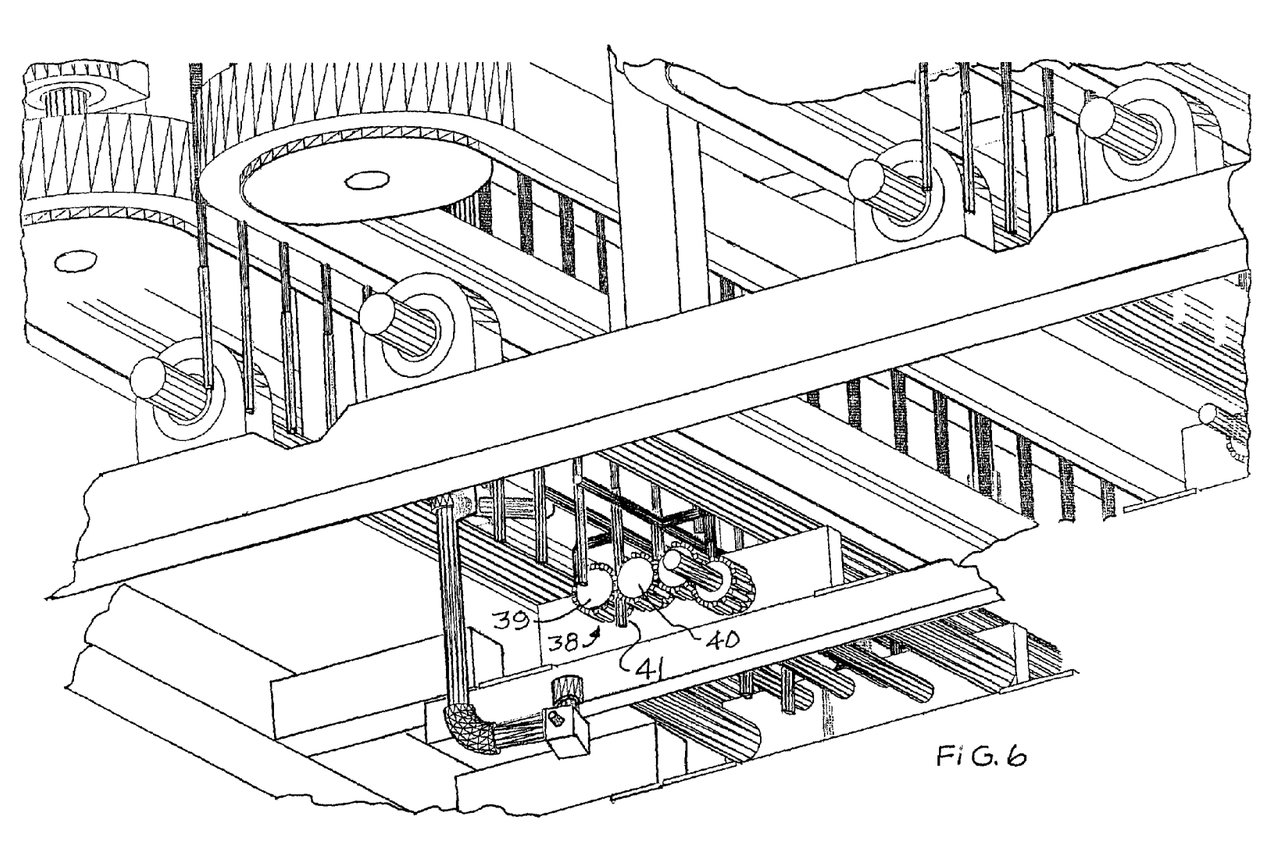
FIG. 6 is an enlarged fragmentary pictorial view of the de-rooter portion of the system of FIG. 1.

Referring now to the drawings, and more particularly FIGS. 1, 3 and 6 thereof, there is illustrated an embodiment of a de-rooting system 35. The de-rooting system is adapted to receive onions, such as onion 41, as they advance through the de-rooting system where the roots, or portions thereof, are removed.

Considering now the de-rooter in more detail, the de-rooter includes a pair of de-rooting systems 35 and 36 which are similar to one another and positioned in generally parallel lanes. De-rooting system 35 is disposed on the left side of peeler and de-rooter processor 23, and the de-rooting system 36 is disposed on the right side of system 10.

De-rooting system 35 includes two pairs of meshing gears, such as gears 37 and 38 which are similar to one another and are spaced apart. The roots of the peeled green onions, such as onion 41 (FIG. 1), are each then moved seriatim into engagement with the two pairs of gears 37 and 38.

The pairs of gears 38 contain a pair of rotating meshing gears 39 and 40. The onions are supported from above in a vertical hanging disposition by a soft faced conveyor 56 comprising soft faced belts 57 and 58 to transport the onion 41 over the de-rooter gears 39 and 40, after passing over the similar meshing gears 37. The two pairs 37 and 38 provide a redundant operation.

As the gears turn, pair of gears 38 provides a downward force on the roots of the green onions in opposition to the force applied at the upper portion of the green onion for supporting it in a vertical hanging disposition. The opposing forces cause the roots to be separated from the remaining structure of the green onion at or near the root crown at a line 42. In this regard, the root crown either is ripped apart or otherwise becomes separated, or the bottom portions of the roots are torn off leaving the root crown intact. Thus, either all or a substantial portion of the green onions being processed have their roots either removed entirely or a substantial portion of the roots are torn away, to leave either all or a substantial portion of the root crown intact.

Figure 4:
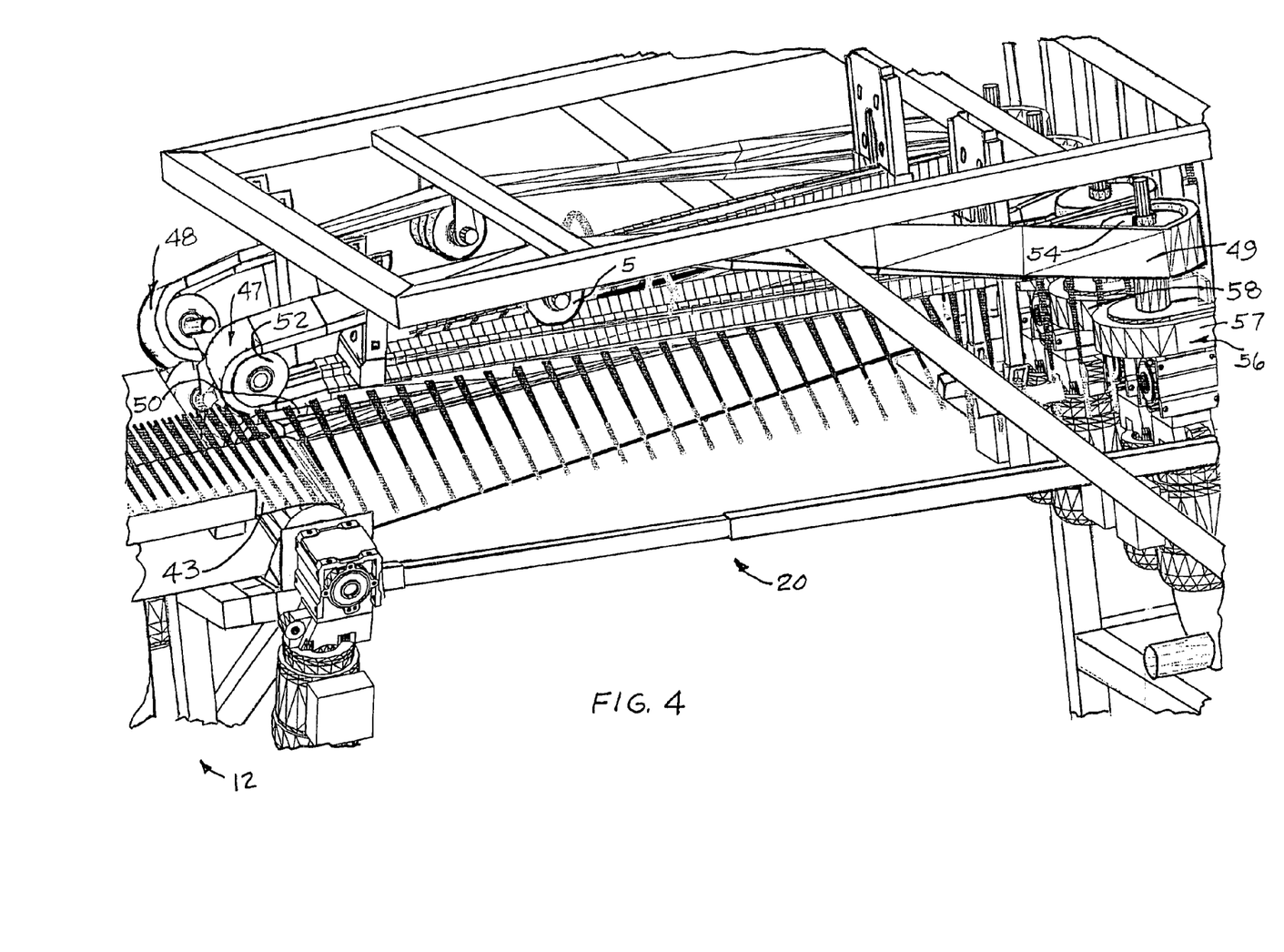
FIG. 4 is an enlarged fragmentary pictorial view of the transition portion of the system illustrated in FIG. 1.

Considering now the infeed 12 in greater detail with reference to FIGS. 1 and 4, infeed 12 facilitates the arrangement of the green onions by human workers or other mechanical means (not shown) into the system 10 in an orderly arrangement for processing by system 10. Additionally, the infeed 12 prepares the onions for processing by causing the onions to be moved seriatim into engagement with the transition conveyor 20 and the peeler and de-rooter processor 23.

To facilitate the placement of the green onions into the system 10 for processing, each station 14 and 16 contain generally horizontal conveyors 43 and 45 respectively. The conveyors 43 and 45 could be flat, at about zero degrees, where human workers or other mechanical device (not shown) sequentially place the green onions thereon. Preferably, however, the conveyors 43 and 45 are angled approximately twenty degrees from the horizontal toward the outer edges of the stations 14 and 16. The slightly angled conveyors reduce the amount of stress placed on the manual workers placing the green onions thereon from totes or baskets (not shown) containing the green onions. Furthermore, stations 14 and 16 are placed at the left side and right side of system 10 to increase the efficiency and speed in which green onions may be placed in the infeed 12 since workers may be placed at both sides of the infeed 12 and work in parallel. It is preferable that infeed 12 be sufficiently long enough to permit more than one worker to be placed at each station 14 and 16.

In order to prepare the onions for processing by other sub-systems and apparatuses of system 10, the stations 14 and 16 are constructed to easily permit the green onions, such as onion 18, to be placed on the conveyors 43 and 45 in a horizontal disposition and laterally spaced so that the onions may be moved seriatim into engagement with other sub-systems and apparatuses of system 10. The conveyors 43 and 45 move at an appropriate speed to allow the manual workers adequate time to place the onions on the conveyors and laterally space them out in a substantially parallel orderly arrangement as clearly indicated in FIG. 1.

Considering now transition conveyor 20 in greater detail with reference to FIGS. 1 and 4, the transition conveyor further includes pairs of twisted soft faced compression conveyors 47 and 48 that receive and clamp the horizontally disposed onions from the infeed 12 and span the majority of the length of the transition system 20. The twisted soft faced compression conveyors 47 and 48 include, soft faced belts 49 and 50 and apply sufficient pressure to transport the onions since excessive pressure may otherwise damage the onion.

Belt 49 frictionally engages the belt 50 in a relationship suited to clamp the top surface of the green onions. Each belt 49 and 50 is positioned in a horizontal disposition at the entrance end of transition conveyor 20 and are twisted end-to-end. The twisted soft faced compression conveyor includes a pulley system which includes a generally horizontal pulley 52 placed at the entrance end of the transition conveyor 20, a vertical pulley 54 placed at the exit end of transition conveyor 20 and an intermediate pulley 55 disposed between the vertical and horizontal pulleys. The soft faced conveyor belt 49 is wrapped around all three pulleys and driven by at least one of the pulleys, such as the vertical pulley 54. Soft faced conveyor belt 50 is driven by a similar pulley system as just described. When vertical pulley 54 coupled to belt 49 and the corresponding vertical pulley coupled to conveyor belt 50 are powered by motors, both belts 49 and 50 travel along their respective pulley systems. The frictionally coupled portions of each soft faced conveyor belt travel from the entrance portion to the exit portion of the transition system 20 to cause the onions to be rotated from a generally flat disposition from the infeed 12 to a generally vertical disposition for the processor 23.

Soft faced compression conveyor 48 is similar to the soft faced compression conveyor 47, and is disposed in parallel with soft faced compression conveyor 47 at the opposite end of the transition conveyor 20.

In operation, when the twisted soft faced or spongy compression conveyor 47 is enabled, green onions, such as onion 21, are sequentially taken from the infeed and clamped between the two soft faced or spongy conveyor belts 49 and 50 where belts 49 and 50 are frictionally coupled together. The onion is then received from the infeed conveyor as best seen in FIG. 4, and transported to the exit end of the transition conveyor 20 through the motion of the soft faced or spongy conveyor belts 49 and 50. As the onion is transported, the onion is rotated approximately ninety degrees to a generally vertical disposition as a result of the change in orientation of the twisted soft faced or spongy conveyor belts as the belts traverse the length of the transition conveyor 20. It should be noted that twisted soft faced or spongy compression conveyor 48 operates in a similar manner and in parallel. At this point, the vertically disposed onions are ready to be transported through the peeler and de-rooter processor 23.

Considering now the peeler and de-rooter processor 23 in more detail with reference to FIGS. 1 and 4, the processor 23 receives generally vertically disposed onions, such as onion 31, from the exit end of the transport conveyor 20 and are conveyed through the peeler and de-rooter for peeling the outer skins from the onions and removing the roots. The onions are conveyed through peeler and de-rooter processor 23 by soft faced or spongy belts 57 and 58 which serve to clamp the tops of the onions as they traverse the processor 23. Soft faced or spongy belts 57 and 58 traverse the length of peeler and de-rooter processor and are similar to the twisted soft faced or spongy conveyor belts 47 and 48 described herein above except that soft faced or spongy belts are not twisted and are generally disposed for clamping and transporting the onions generally vertically through the peeler and de-rooter processor 23.

Considering now peeler 25, in greater detail with reference to FIGS. 1 and 5, the peeler 25 is similar to peeler 27. The peeler 25 generally includes pairs of water jets, such as the jets 29 and 30 placed in opposing and operative relationship to one another to form lines of intersection for peeling the outerskin of green onions. Using more than one set of water jets may be desirable for redundancy to ensure that the outer skin is completely removed in the case where the outer skin was not completely removed by the first pair of water jets. It is preferable to have three water jet pairs spaced apart in a row to obtain optimum removal of the outer skins. As shown in FIG. 1, the water jet pairs include the pair 29 and 30, a pair 60 and 61, and a pair 63 and 65.

The peeler systems, such as peeler system 25, further include a pair of opposed rotating brushes 67 and 69 which engage opposite sides of the onions leaving the three pairs of water jets. The brushes serve to remove any unwanted material from the green onions that may not have been completely removed by the water jets. The brushes are preferred to be disposed after the water jets but other orientations are acceptable.

An additional pair of water jets 72 and 74 are positioned after the pair of brushes 67 and 69, to clean any dirt or remaining debris from the brushed onion. It will become apparent to one skilled in the art that any amount of brushes and pairs of water jets may be included in a variety of combinations to obtain the most optimal system for removing the outer skins and cleaning the green onions.

As shown, the onions pass through a pair of brushes 76, followed by a pair of water jets 78, to help ensure that the onion's outerskin is completely removed and the onion is clean before the onion is conveyed to a final pair of brushes 81 and then a final pair of water jets 83. The onions are next transported by belts 57 and 58 to and through de-rooter.

Considering now a de-rooter such as de-rooter 35 in greater detail with reference to FIGS. 1 and 3, the roots of the peeled green onions, such as onion 41, are each moved seriatim into engagement with the de-rooter 35 which includes the pairs of gears 37 and 38. Pair of gears 38 comprise a pair of rotating gears 39 and 40. As the onions traverse the de-rooter 35, the onions are supported in a vertical hanging disposition by the soft faced or spongy belts 57 and 58. As the gears turn, the pair of gears 37 provide a downward force on the roots of the green onions in opposition to the force applied at the upper portion of the green onion for supporting it in a vertical hanging disposition.

The method includes applying opposing forces to the onions to separate the roots at the root crown from the remaining portion of the onion structure. In so doing, the opposed forces tend to pull apart or otherwise take apart the root crown. The remaining portion of the root crown tends to prevent the unwanted telescoping of the onion. If the root crown is not able to be pulled apart, the roots tend to break apart or be torn off, leaving the entire root crown intact to serve to help protect against the undesirable telescoping effect. This method is fully described in the foregoing mentioned non-provisional patent application entitled "METHODS AND APPARATUS FOR PROCESSING VEGETABLES."

The applying of the opposing forces includes applying force to the bottom portion of each one of the onions below the intersection of the root crown and the bulb in opposition to force applied to the top portion of the onion. As a result, the bottom portion is separated from the onion at the root crown. The bottom portion may include a broken off portion of the root crown with all of the root attached thereto, or may include torn off portions of the roots only. In this manner, the remaining portion of the root crown stays in tact with the onion to prevent or inhibit unwanted telescoping growth.

In one embodiment, as shown in FIG. 1, the onion, such as onion 41 first engages pairs of gears 37 where the green onion 41 is de-rooted. The green onions are then moved into engagement with pair of gears 38 so that in the event that the roots have not been removed by gears 37, they will undergo a second de-rooting operation similar to the method described in connection with the first pair of gears 37.

Considering now pair of gears 38 in even greater detail with reference to FIGS. 1 and 3, the conveyor 56 formed of soft faced or spongy belts 57 and 58 grips and holds opposite sides of the stalk of the onion 41 to support the onion 41 in a generally vertical disposition as it is moved to and past the pairs of gears 38. The conveyor belt 56 transports the green onion 41 to the pairs of gears 38 for root removal on the fly. The pairs of gears 38 includes a pair of rotating members in the form of gears 39 and 40 mounted for rotation about their respective horizontal axes. In this regard, the gears 39 and 40 are driven about their respective horizontal axes in opposite directions. The roots of the onions are moved into engagement between the closely spaced gears 39 and 40, which pull downwardly on the roots to provide an opposing force relative to the force applied by the belts 56. The opposing forces may separate or rip apart the root crown. Alternatively, if the root crown does not fracture, the roots may tear apart under the opposing longitudinal forces, thus providing roots of a shorter length without removing any portion of the root crown. The separated portion of the root crown and the roots, or just the torn off portions of the roots, are discharged downwardly from the rotating gears 39 and 40 and fall under the force of gravity for discarding them. It should be apparent to one skilled in the art that gears 39 and 40 may be substituted for rollers or other rotating members.

After exiting the de-rooter, the processed onions drop from the processor conveyors and are conveyed to be further processed.

Further modifications will also occur to those skilled in this art, and such are considered to fall within the spirit and scope of the invention as defined in the appended claims. For example, the various components disclosed herein may be arranged in various different orders and combinations, and a greater or lesser number of the components may be employed as desired.

What is claimed is:

1. A method of processing green onions having an outer skin, a bulb, a root crown, comprising: receiving a green onion; transitioning the green onion to a substantially vertical disposition; supporting the green onion in a vertical disposition by securing a top portion of the green onion and moving the green onion along a horizontal line of travel between an entrance end and an exit end of a peeling station; peeling the green onion by creating first and second water streams under pressure forming a line of intersection, the line of intersection being nonparallel to the advancement direction of the green onions and being interposed between the entrance end and the exit end of the peeling station; and the line of intersection being angularly inclined downwardly toward the exit end of the peeling station; wherein the green onion point of contact on the intersecting water stream moves further toward the root of the green onion as the green onion continues to advance through the intersecting water stream so that the intersecting water stream peels downwardly the outer skin away from the green onion; and de-rooting the green onion by driving like sized rotating members sufficiently to apply an abrupt jarring downward force to a bottom portion of the green onion to rip apart a root crown to separate a bottom portion only of the root crown from the remaining portion of the green onion.

2. A method as recited in claim 1, wherein the step of de-rooting further includes applying the downward force to the green onion to rip apart the root crown from the remaining portion of the root.

3. A method according to claim 2, wherein the step of applying the downward force includes applying force to the bottom portion of the green onion below the intersection of the root crown and the bulb to separate the bottom portion from the green onion by ripping apart the root crown.

4. A method according to claim 1, wherein the outer skin is removed as each green onion passes through the line of intersection.

5. A method of peeling a green onion having an outer skin and a root crown, comprising: moving the green onion between an entrance end and an exit end of a path of travel; creating first and second water streams under pressure forming a line of intersection, the line of intersection being nonparallel to the advancement direction of the green onion along the path of travel and being interposed between the entrance end and the exit end of the path of travel, the line of intersection being angularly inclined toward the exit end of the path of travel; wherein the green onion point of contact on the intersecting water stream moves further toward the root of the green onion as the green onion continues to advance through the intersecting water stream so that the intersecting water stream peels the outer skin away from the green onion; and de-rooting the green onion by driving like sized rotating members sufficiently to apply an abrupt jarring downward force to a bottom portion of the green onion to rip apart a root crown to separate a bottom portion only of the root crown from the remaining portion of the green onion.

6. A method of making a peeling station for peeling a green onion having an outer skin and a root crown, comprising: providing a conveyor for the green onion to move the green onion along a path of travel between an entrance end and an exit end thereof; providing first and second water jets for forming water streams under pressure that form a line of intersection angularly inclined toward the exit end of the path of travel, the line of intersection being nonparallel to the advancement direction of the green onion; interposing the water jets between the entrance end and the exit end of the path of travel; and wherein the green onion point of contact on the intersecting water stream formed by the water jets moves further toward the root of the green onion as the green onion continues to advance through the intersecting water stream so that the intersecting water stream peels the outer skin away from the green onion: and de-rooting the green onion by driving like-sized rotating members sufficiently to apply an abrupt jarring downward force to a bottom portion of the green onion to rip apart a root crown to separate a bottom portion only of the root-crown from the remaining portion of the green onion.

7. A method as recited in claim 6, wherein the water streams formed under pressure are fan shaped and wherein the first water jet emits water under pressure in a direction that intersects the water under pressure being emitted from the second water jet to form the line of intersection.

8. A method of processing green onions having an outer skin, a bulb, and a root crown, comprising: receiving a green onion, transitioning the green onion to a substantially vertical disposition; supporting the green onion in a vertical disposition by securing a top portion of the green onion and moving the green onion along a horizontal line of travel between an entrance end and an exit end of a peeling station; peeling the green onion by creating first and second water streams under pressure forming a line of intersection, the line of intersection being nonparallel to the advancement direction of the green onions and being interposed between the entrance end and the exit end of the peeling station: and the line of intersection being angularly inclined downwardly toward the exit end of the peeling station; wherein the green onion point of contact on the intersecting water stream moves further toward the root of the green onion as the green onion continues to advance through the intersecting water stream so that the intersecting water stream peels downwardly the outer skin away from the green onion; and de-rooting the green onion by driving like sized rotating members sufficiently to apply an abrupt jarring downward force using the pair of like sized rotating members to a bottom portion of the green onion to rip apart a root crown to separate a bottom portion only of the root crown from the remaining portion of the green onion, wherein the green onions are secured by the top portion at the time of applying the abrupt jarring force, the green onions are transported to the rotating members in a direction generally perpendicular to an axis of each of the rotating members.

9. A method of peeling a green onion having an outer skin and a root crown, comprising: moving the green onion supported by a top portion between an entrance end and an exit end of a path of travel; creating first and second water streams under pressure forming a line of intersection, the line of intersection being nonparallel to the advancement direction of the green onion along the path of travel and being interposed between the entrance end and the exit end of the path of travel, the line of intersection being angularly inclined toward the exit end of the path of travel; wherein the green onion point of contact on the intersecting water stream moves further toward the root of the green onion ad the green onion continues to advance through the intersecting water stream so that the intersecting water steam peels the outer skin away from the green onion; and de-rooting the green onion by driving like sized rotating members sufficiently to apply an abrupt jarring downward force to a bottom portion of the green onion to rip apart a root crown to separate a bottom portion only of the root crown from the remaining portion of the green onion.

10. A method of making a peeling station for peeling a green onion having an outer skin and a root crown, comprising: providing a conveyor for the green onion to move the green onion supported by a top portion along a path of travel between an entrance end and an exit end thereof; providing first and second water jets for forming water streams under pressure that form a line of intersection angularly inclined toward the exit end of the path of travel, the line of intersection being nonparallel to the advancement direction of the green onion; interposing the water jets between the entrance end and the exit end of the path of travel; wherein the green onion point of contact on the intersecting water stream formed by the water jets moves further toward the root of the green onion as the green onion continues to advance through the intersecting water stream so that the intersecting water stream peels the outer skin away from the green onion; and de-rooting the green onion by driving like sized rotating members sufficiently to apply an abrupt jarring downward force to a bottom portion of the green onion to rip apart a root crown to separate a bottom portion only of the root crown from the remaining portion of the green onion.

* * * * *